E. T. BETKER.
WATER AND GAS CONTROLLER FOR WATER HEATERS.
APPLICATION FILED APR. 22, 1911.
1,108,321.
Patented Aug. 25, 1914.
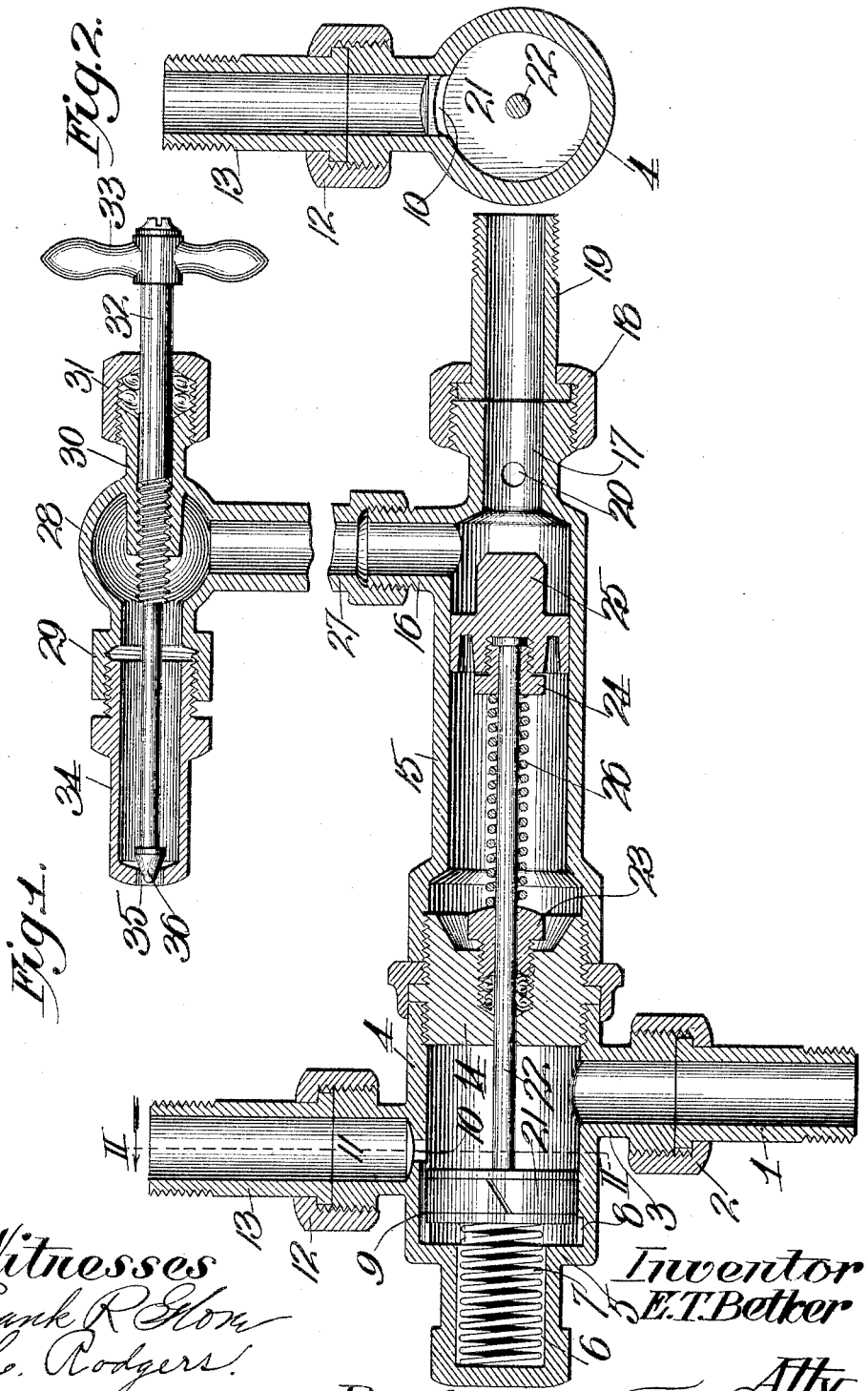

UNITED STATES PATENT OFFICE.

EDWARD T. BETKER, OF KANSAS CITY, MISSOURI, ASSIGNOR TO IMPERIAL HEATER COMPANY, OF KANSAS CITY, MISSOURI, A CORPORATION OF MISSOURI.

WATER AND GAS CONTROLLER FOR WATER-HEATERS.

1,108,321.   Specification of Letters Patent.   Patented Aug. 25, 1914.

Application filed April 22, 1911. Serial No. 622,804.

*To all whom it may concern:*

Be it known that I, EDWARD T. BETKER, a citizen of the United States, residing at Kansas City, in the county of Jackson and State of Missouri, have invented certain new and useful Improvements in Water and Gas Controllers for Water-Heaters, of which the following is a specification.

This invention relates to automatic gas and water controllers for water heaters and has for its object to produce a device of this character which operates efficiently and reliably and can be manufactured and installed cheaply, and which furthermore, embodies the desirable features of simplicity and durability.

With these objects in view the invention consists in certain novel and peculiar features of construction and organization as hereinafter described and claimed; and in order that it may be fully understood reference is to be had to the accompanying drawing, in which—

Figure 1, is a central vertical longitudinal section of a controller embodying my invention. Fig. 2, is a vertical section on the line II—II of Fig. 1.

In the said drawings, 1 is a pipe for connection with a water service pipe, not shown, and 2 is a coupling nut clamping said pipe firmly upon and in communication with a tubular arm 3 of a cylindrical casing 4. The casing 4 is provided at one end with a head 5 having a socket 6, containing an expansive helical spring 7 arranged longitudinally of the casing. Adjacent to said head, the chamber of the casing is diametrically enlarged as at 8, and communicating at one end with said enlargement is a narrow channel 9 formed in the interior face of the casing, the opposite end of said channel communicating with the outlet port 10, leading into a hollow arm 11 of the casing, and said arm is connected by a coupling nut 12, to the short pipe 13 adapted for connection with a coil, not shown, through which water is adapted to circulate, the coil being of any well known type.

14 indicates a detachable head secured in the opposite end of the casing from head 5, and in the adjacent end of the alined casing 15, provided with an upwardly projecting tubular arm 16. The opposite end of the casing 15 is diametrically reduced to constitute a tubular arm 17 of which one end forms a valve seat, and said arm is coupled by a nut 18 to a gas supply pipe 19 for connection with the gas service pipe, not shown. The arm 17 is also provided with an orifice 20, through which gas may pass for pilot lighting purposes, but as the pilot lighting mechanism forms no new or essential feature of the controller, it is omitted from the drawing.

Arranged reciprocally in the casing 4 is a piston 21 having a stem 22 extending slidingly through head 14, and the packing nut 23, secured to said head. At its rear end the stem is fastened as shown, by a nut 24 to a slide valve 25 fitting with a gas-tight relation in casing 15, said valve when the piston is withdrawn to cut off the passage of water to port 10, being seated upon said valve seat to cut off the supply of gas to the chamber of the casing 15, and its tubular arm 16. Spring 7 occupying socket 6, exerts a yielding pressure upon the face of valve 21 and tends to hold the same and the gas valve in the closed position last referred to, and coöperating with said spring in performing the function named, is a spring 26 bearing at its front end against packing nut 23 and at its rear end against nut 24.

The tubular arm 16 of the gas casing communicates with the tubular arm 27 of a needle valve casing 28, and said casing is provided at opposite sides and in alinement with pipe 13, with forwardly and rearwardly projecting tubular arms 29 and 30, the latter carrying a packing nut 31 to form a gas tight joint with the valve 32 extending through the casing and arms 29 and 30 thereof, and bearing a threaded relation with the casing adjacent to the last-named arm. Secured on the rear end of the valve for the purpose of adjusting the same to open or closed position, is a handle 33, and secured to the arm 29 is a cap 34 provided at its front end with an orifice 35, controlled by the front or tapered end 36 of the valve, said end being adapted to enter said orifice and cut off the passage of gas therethrough.

When it is desired to heat water quickly, the water is turned on and enters the chamber of the cylindrical casing 4 between the head 14 and valve 21, and, overcoming the resistance of springs 7 and 26, forces the piston forward, the water standing in the cylinder ahead of the piston being free to pass from chamber 8 through channel 9 to port 10, chamber 8 and channel 9 therefore guarding against water ahead of the piston offering any resistance to the free forward movement of the same. As the piston exposes port 10, the water passes up through said port, arm 11 and pipe 13, and circulates through the coil in the customary manner. The forward movement of the piston effects the unseating of the valve 25 and permits gas to pass from the service pipe through pipe 19 and tubular arm 17, into the rear end of casing 15, and thence through arm 16 into the needle valve casing 18. The operator then opens valve 32 if such adjustment has not previously been effected, and ignites the gas which will instantly escape through orifice 35, unless such gas is ignited by the pilot light, which will of course occur if the latter is in operation. Under ordinary conditions valve 32 will stand normally open and if in such position it will be seen that the controller operates automatically when the water is turned on. The flame impinges upon the pipe 13, and may also impinge upon the coil so that the water shall be heated very quickly. When sufficient hot water is obtained the supply of cold water is cut off and as a result the springs instantly effect backward movement of the piston 21 and cause the same to close communication between the supply and outlet port 10, the valve 25 at the same time engaging its seat and cutting off the supply of gas from arm 17, and said parts will remain in the closed positions mentioned until the water is again turned on, it being noted that water from the coil will back down into the casing 4 ahead of the piston and be again forced out of port 10 when the next advance occurs.

From the above description it will be apparent that I have produced a gas and water controller for water heaters embodying the features of advantage enumerated, and while I have illustrated and described the preferred embodiment of the invention I wish it to be understood that I do not desire to be restricted to the exact details of construction shown and described, as obvious modifications will suggest themselves to one skilled in the art.

I claim:

In an automatic gas and water controller for water heaters, a water-supply casing having inlet and outlet openings located out of alinement and a reduced hollow extension at one end of the casing, said outlet opening being located nearer than the inlet opening to said extension, a piston operating within the casing and adapted to reciprocate across said outlet opening, said casing being provided with an interior water channel leading around said piston from the outlet opening to the extension to permit water to flow toward and from the extension during the movements of the piston, a spring seated in said extension and adapted to react against said piston, a plug fitted in the other end of said casing, a gas-supply casing fitted on said plug and having gas inlet and outlet ports, a slide valve within said gas-supply casing for controlling said inlet port, a piston-rod operating through said plug and connecting said valve and piston, and a spring coiled about said rod between said plug and valve and coöperating with said first-named spring in maintaining the piston and valve normally in position to close said outlet opening and inlet port respectively.

In testimony whereof I affix my signature, in the presence of two witnesses.

EDWARD T. BETKER.

Witnesses:
 HELEN C. RODGERS,
 G. Y. THORPE.

Copies of this patent may be obtained for five cents each, by addressing the "Commissioner of Patents, Washington. D. C."